US008050978B2

(12) United States Patent
Payton

(10) Patent No.: US 8,050,978 B2
(45) Date of Patent: Nov. 1, 2011

(54) METHOD AND SYSTEM FOR AN ELECTRONIC MARKETPLACE FOR INFORMATION PRODUCTS

(75) Inventor: David W. Payton, Calabasas, CA (US)

(73) Assignee: Raytheon Company, Waltham, MA (US)

( * ) Notice: Subject to any disclaimer, the term of this patent is extended or adjusted under 35 U.S.C. 154(b) by 468 days.

(21) Appl. No.: 12/394,411

(22) Filed: Feb. 27, 2009

(65) Prior Publication Data

US 2010/0223148 A1 Sep. 2, 2010

(51) Int. Cl.
*G06Q 30/00* (2006.01)

(52) U.S. Cl. ............... 705/26.1; 705/26.2; 705/26.3

(58) Field of Classification Search ........... 705/26, 705/27

See application file for complete search history.

(56) References Cited

U.S. PATENT DOCUMENTS

| 5,654,968 | A | 8/1997 | Smiroldo |
| 5,721,735 | A | 2/1998 | Smiroldo |
| 5,794,219 | A | 8/1998 | Brown |
| 6,055,518 | A | 4/2000 | Franklin et al. |
| 6,151,589 | A | 11/2000 | Aggarwal et al. |
| 6,161,099 | A | 12/2000 | Harrington et al. |
| 6,199,050 | B1 | 3/2001 | Alaia et al. |
| 6,223,167 | B1 | 4/2001 | Alaia et al. |
| 6,631,356 | B1 | 10/2003 | Van Horn et al. |
| 7,908,207 | B2 * | 3/2011 | Boyle et al. ............... 705/37 |
| 7,979,291 | B2 * | 7/2011 | Sussman et al. ............... 705/5 |
| 2002/0107787 | A1 | 8/2002 | Mashinsky et al. |
| 2003/0130930 | A1 | 7/2003 | Miura et al. |
| 2005/0044032 | A1 * | 2/2005 | Lee et al. ............... 705/37 |
| 2005/0080707 | A1 | 4/2005 | Glasspool |
| 2005/0144587 | A1 | 6/2005 | Bryant |
| 2005/0154667 | A1 * | 7/2005 | Guler et al. ............... 705/37 |
| 2007/0146772 | A1 * | 6/2007 | Castellani ............... 358/1.15 |
| 2008/0046329 | A1 * | 2/2008 | Logan ............... 705/26 |
| 2008/0082425 | A1 | 4/2008 | Payton |
| 2008/0120129 | A1 * | 5/2008 | Seubert et al. ............... 705/1 |
| 2008/0235158 | A1 * | 9/2008 | Manchala et al. ............ 705/400 |
| 2009/0287532 | A1 * | 11/2009 | Cohen et al. ............... 705/9 |

OTHER PUBLICATIONS

Payton, David, "Method and System for Prioritizing a Bidder in an Auction"; U.S. Appl. No. 11/537,226; 27 pages, 2 pages of drawings, pending, Filed Sep. 29, 2006.
"National Security and Horizontal Integration"; AFCEA International; 2004; pp. 1-13, 2004.
"The Marbles Manifesto: A Definition and Comparison of Cooperative Negotiation Schemes for Distributed Resource Allocation"; Martin Frank et al.; Information Sciences Institute of the University of Southern California, 10 pages, Copyright 2000.

* cited by examiner

*Primary Examiner* — Jeffrey A Smith
*Assistant Examiner* — Courtney Stopp
(74) *Attorney, Agent, or Firm* — Baker Botts L.L.P.

(57) ABSTRACT

In one embodiment, a method for an electronic auction transaction includes organizing by a computer each of a plurality of task requests into one or more respective groups. Each task request corresponds to a respective desired use of one or more resources. In addition, each task request has a respective task bid. The computer determines a group bid for each group at least in part by comparing the products calculated by multiplying each first bid within the group by a respective multiplier. The group bid is indicative of a collective value associated with the task bids of the group. The respective multiplier is a number indicative of the comparative value of the task bid relative to the other task bids in the group. The computer determines one or more winning group bids by comparing the group bids to each other.

42 Claims, 3 Drawing Sheets

METHOD AND SYSTEM FOR AN ELECTRONIC MARKETPLACE FOR INFORMATION PRODUCTS

TECHNICAL FIELD

This disclosure relates in general to electronic market transactions, and more particularly to a method and system for an electronic marketplace for information products.

BACKGROUND

A variety of auction-based services exist, some of which may be accessed online via the internet. The items bought and sold in electronic marketplaces and on-line auctions are typically products for which there are a limited number. The emphasis, therefore, is often to find the best allocation of the fixed number of items to the appropriate highest bidders. Conventionally, only the highest bidders are allowed the benefit of the auctioned item.

SUMMARY

In one embodiment, a method for an electronic auction transaction includes organizing by a computer each of a plurality of task requests into one or more respective groups. Each task request corresponds to a respective desired use of one or more resources. In addition, each task request has a respective task bid. The computer determines a group bid for each group at least in part by comparing the products calculated by multiplying each first bid within the group by a respective multiplier. The group bid is indicative of a collective value associated with the task bids of the group. The respective multiplier is a number indicative of the comparative value of the task bid relative to the other task bids in the group. The computer determines one or more winning group bids by comparing the group bids to each other.

Advantages of certain embodiments of the present disclosure include facilitating the market-based allocation or tasking of one or more resources such that their outputs may provide enhanced value to one or more users or tasks that may benefit from that output. Some embodiments may allocate a potentially unlimited number of identical, easily replicated items that have yet to be produced. Various embodiments allow multiple bidders to be automatically and dynamically grouped together to win a particular resource. In some embodiments, group participation may be completely transparent to individual bidders, thereby enhancing privacy and facilitating the bidding process. Some embodiments provide enhanced pricing mechanisms that may enhance individual bidder incentive.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Particular embodiments of the present disclosure may be used in the context of an electronic marketplace wherein multiple bidders compete for access to a finite set of resources but where use of these resources may be shared among groups of bidders. In some embodiments, the product or output of a resource is readily replicated and may be distributable to each of a plurality of winning bidders. Some such embodiments enable the marketplace to determine what product or output each resource will produce such that this replicated product or output can maximize the benefit to those bidders who regard the product or output with the highest collective valuation. The example embodiments of the present disclosure are best understood by referring to FIGS. 1A through 4 of the drawings, like numerals being used for like and corresponding parts of the various drawings.

Figures 1A, 1B:
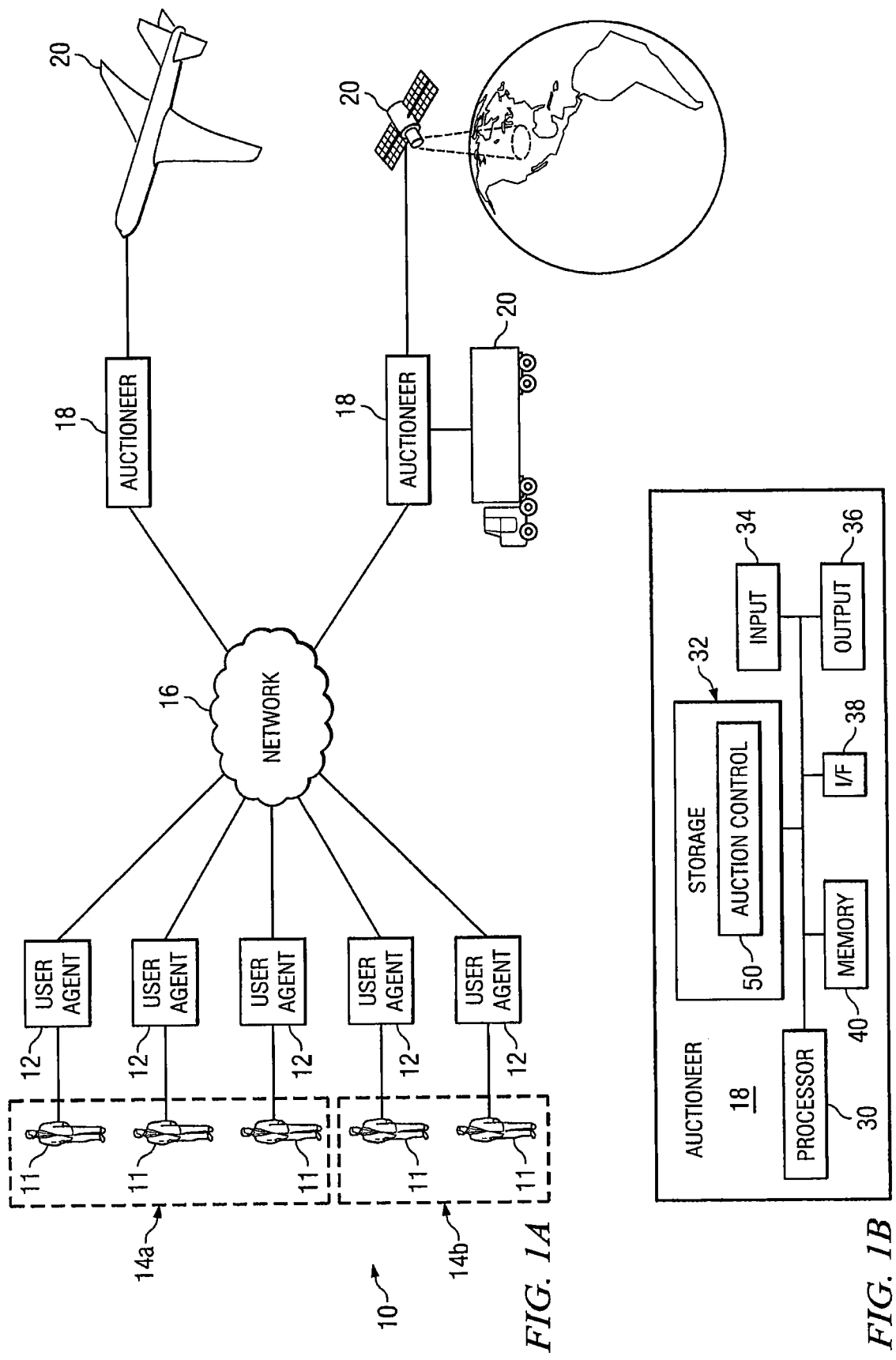
FIG. 1A is a block diagram illustrating one embodiment of a system used in conducting an auction in accordance with one embodiment of the present disclosure.
FIG. 1B is a block diagram illustrating one embodiment of the auctioneer of the system of FIG. 1A.

FIG. 1A is block diagram illustrating a portion of a system 10 that may be used to conduct an electronic marketplace transaction according to one embodiment. System 10 generally includes one or more user agents 12 accessible by one or more respective users or bidders 11 and organized into one or more groups 14, a network 16, one or more auctioneers 18, and one or more resources 20. In general, system 10 allows user agents 12 to connect to auctioneers 18 so that bidders 11 may take part in an electronic auction for resources 20.

User agent 12 generally refers to any suitable device capable of communicating with network 16 and further capable of allowing users 11 to bid on resources 20 in an auction. For example, user agent 12 may include a personal digital assistant, a computer such as a laptop, a cellular telephone, a mobile handset, or any other device capable of communicating with network 16 and further capable of allowing users 11 to bid on resources 20 in an auction. In the illustrated embodiment, user agent 12 refers to a computer. Users 11 generally refer to any suitable entity capable of using user agent 12 to bid on resources 20. For example, users 11 may include a person, a program, a device, an automation, or any other suitable entity, including combinations thereof. In this example, users 11 are organized into two groups 14a and 14b according to respectively requested tasks, as explained further below.

Network 16 may refer to any interconnecting system capable of transmitting audio, video, signals, data, messages, or any combination of the preceding. Network 16 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise internet, or any other suitable communication link, including combinations thereof.

Auctioneer 18 may refer to any suitable device capable of communicating with network 16 and further capable of conducting an auction for resources 20. For example, auctioneer 18 may include a personal digital assistant, a computer, such as a laptop, a cellular telephone, a mobile handset, or any other device capable of communicating with network 16 and further capable of conducting an auction for resources 20. In the illustrated embodiment, auctioneer 18 refers to a server.

Resource 20 may refer to any available resource or source of wealth capable of performing a task. In some embodiments, resource 20 may be an entity (e.g., a person, a group, an organization, a machine, collection of machines etc.) capable of producing a product. For example, in some embodiments resource may be one or more entities artists, authors, engineers, or robotics capable of producing any combination or multiples of the following: a musical composition, a writing, an image, a photograph, a video, a poem, a program, or any other of a variety of other products. In some embodiments, users 11 may bid on resources 20 in a manner that controls a particular detail of a product yet to be produced. For example, users may bid on a style or theme of a musical composition yet to be produced, a particular subject of a writing, photograph, or poem, the functionality of a software program, and so forth. Some such example products are easily reproducible and thus may be efficiently distributed (e.g., in encrypted digital form through the Internet) to a variety of users 11.

In addition, resource 20 may include, for example, one or more information-producing or information-gathering resources, such as, for example, a camera, a high-power telescope, or a military satellite, where the information possibilities might be of interest to more than one individual or can serve more than one purpose; however, any suitable resource capable of performing a task may be used, including, for example, a transportation or recreation resource in the form of a plane, boat, truck, or bus. In this example, resource 20 includes one or more cameras and/or antenna arrays that may be pointed or tuned in certain ways in order to gather or transmit particular types of information.

In some embodiments, resource 20 may be divisible into non-interfering elements or "market items," either functionally or in time. For example, if a resource 20 can be tasked differently at different time segments without interference from one time segment to the next, then these time segments can constitute distinct market items. In such embodiments, the resource 20 availability can then be divided into a discrete set of timeslots. Each timeslot that is suitable to the requested task may be assigned a unique market item identifier and this market item identifier may be returned to the requesting user agent 12 along with other details or settings of the resource properties (such as sensor position, and sensor characteristics) associated with that market item. For any particular settings of resource 20, the information gathered at those settings may benefit several distinct needs. At the same time, however, there may be competing needs for the resource 20 that are optimized by various different settings. Some embodiments may enable groups 14 (e.g., groups 14*a* and 14*b*) of users 11 to compete with one another to establish which group 14 will determine the parameter settings of resource 20 to be used. In the case of multiple resources 20, various embodiments may further include the ability to form different groups 14 for each resource 20 since the commonality of needs may be different on a resource by resource basis.

In operation, a user agent 12 generally registers a new user 11 and receives one or more task requests, which may be desired uses of one or more resources, and respective bids from that user 11. The user agent 12 may communicate through network 16 the user's 11 task request to all available auctioneer(s) 18. Auctioneers 18 may respond by identifying one or more resources 20 under their control that possibly correspond to the user's 11 task request(s). The response may include information that enables the user agent 12 and/or the user 11 to evaluate the relative value of a single resource 20 or combinations of resources 20 for achieving the user's 11 requested task. Auctioneers 18 may also repeatedly communicate or otherwise provide updates on the user's 11 current status, including whether or not the user 11 has been outbid and the current minimum price needed to win a particular resource. Through the course of an auction, a user 11 may repeatedly reassess the cost-benefit for each resource 20 and may choose to bid on whichever resource 20 provides maximum benefit relative to its current cost to win.

According to one aspect of the disclosure, the auctioneers 18 of various embodiments may manage the automated grouping of users 11 into one or more groups 14. For example, when multiple task requests arrive at the auctioneer 18 from either the same user agent 12 or various user agents 12, auctioneer 18 may find market items that might satisfy each request and may, in some instances, identify market items that are common between the various task requests. The commonality between task requests may be used to automatically organize these tasks requests into groups 14. Such groups 14 may be formed around subsets of market item parameters or settings that resource 20 may use to produce the information valued by all members of a particular group 14. In some instances, auctioneer 18 may predetermine the subdivisions of resource parameter space. In other instances, auctioneer 18 may dynamically determine group divisions using, for example, clustering methods to determine parameter sets that provide maximum inclusion of similar group members and maximum distinction between dissimilar group members.

These general principles may be illustrated in the context of a resource 20 that includes a camera, which may be operable to produce images and/or videos that are easily replicated and distributed. The parameter space for such a resource 20 may include settings for the pan angle of the camera, which may be subdivided, for example, into predetermined angles based on the camera's field of view. Auctioneer 18 may determine which of these pan-angle subdivisions is most appropriate for the request. If dynamic parameter subdivisions are used, then pan-angle subdivisions may be determined by the requests that are submitted. For example, pan-angles may be chosen so as to maximize the number of task requests that are associated to each pan-angle while minimizing the number of task requests that are covered by more than one pan-angle. In some embodiments, the composition of any given group 14 may change over time. For example, in the case of dynamic parameter subdivisions, particular task requests may actually be moved from one group 14 to another as parameters associated with groups 14 are changed to accommodate the addition of new users 11 or additional task requests from the same user 11.

In some embodiments, the groupings of task requests may be hierarchically organized. In the context of a resource 20 including a high-power telescope, for example, various users 11 may request live images of a planet. Other users 11 may more specifically request live images of particular planets, such as either Mars or Venus. These more specific task requests may be grouped separately into subgroups of the general task request for images of a planet; however, any suitable number of subgroups (e.g., one to fifty subgroups) and any suitable hierarchical levels (e.g., two, three, four, or more) may be used. Such hierarchical groupings may be based on the assumption that a user 11 requesting an image of a planet in general would be equally satisfied by an image of either Mars or Venus, while users 11 requesting an image of a particular planet would not be satisfied by an image of another planet. In this manner, a particular user's task request might affect a high level group bid in addition to all sublevel group bids of any corresponding subgroups. For example, a user 11 who submits a task request for an image of a planet in general may also be a contributing bidder to both subgroups requesting an image of Mars and Venus respectively. To facilitate comprehension of users needs while maximizing resources 20, various embodiments may prompt users 11 to provide additional information based on the current composition of groups and/or subgroups.

The teachings of another aspect of the disclosure recognize that various embodiments may enable group 14 participation to be completely transparent to individual users 11, such that each user 11 can bid as though it alone will benefit from the particular requested task(s). For example, users 11 may bid on a particular pan-angle of a camera as though the underlying resource 20 will be exclusively serving their respective needs during the designated time slot, even though multiple users may ultimately benefit. This aspect may greatly simplify the overall user 11 interactions with system 10 at least because there is no need for a user 11 to have to select or identify groups in which to participate. Some embodiments may also provide a certain degree of privacy regarding a user's 11 particular interests because other users 11 are not privy to who else is bidding for the same information as themselves.

Another aspect of the disclosure is the determination of distinct bid thresholds for each user 11 indicating the minimum bid needed to win a market item based at least partially on the groups 14 formed and the composite competing bids from these groups 14. Unlike conventional systems, system 10 may provide individual users 11 with different bid price requirements during an auction. At the same time, in order to avoid concerns of unfairness, each user 11 of a particular winning group may ultimately be charged in equal amount relative to the group at the close of an auction, even though this amount might be less than the value of a previously submitted maximum bid. In other words, the minimum bid requirements during an auction may actually be merely a requirement of how much the user 11 must be willing to pay and may not be the final amount that is actually paid by the user 11. Additional details of certain embodiments of the invention are described below with reference to FIGS. 1B through 3.

FIG. 1B is a block diagram illustrating one embodiment of auctioneer 18. In the illustrated embodiment, auctioneer 18 includes a processor 30, a storage device 32, an input device 34, an output device 36, a communication interface 38, a memory device 40, and an auction control 50. The components of auctioneer 18 may be coupled to each other in any suitable manner. In the illustrated embodiment, the components of auctioneer 18 are coupled to each other by a bus.

Processor 30 may refer to any suitable device capable of executing instructions and manipulating data to perform operations for auctioneer 18. For example, processor 30 may include any type of central processing unit (CPU). Storage device 32 may refer to any suitable device capable of storing data and instructions. Storage device 32 may include, for example, a magnetic disk, an optical disk, flash memory, or other suitable data storage device. Input device 34 may refer to any suitable device capable of inputting, selecting, and/or manipulating various data and information. For example, input device 34 may include a keyboard, mouse, graphics tablet, joystick, light pen, microphone, scanner, or other suitable input device. Memory device 40 may refer to any suitable device capable of storing and facilitating retrieval of data. For example, memory device 40 may include random access memory (RAM), read only memory (ROM), a magnetic disk, a disk drive, a compact disk (CD) drive, a digital video disk (DVD) drive, removable media storage, or any other suitable data storage medium, including combinations thereof.

Communication interface 38 may refer to any suitable device capable of receiving input for auctioneer 18, sending output from auctioneer 18, performing suitable processing of the input or output or both, communicating to other devices, or any combination of the preceding. For example, communication interface 38 may include appropriate hardware (e.g., modem, network interface card, etc.) and software, including protocol conversion and data processing capabilities, to communicate through a LAN, WAN, or other communication system that allows auctioneer 18 to communicate to other devices. Communication interface 38 may include one or more ports, conversion software, or both. Output device 36 may refer to any suitable device capable of displaying information to a user. For example, output device 36 may include a video display, a printer, a plotter, or other suitable output device.

Auction control 50 may refer to any suitable logic embodied in a computer-readable media, and when executed capable of conducting an auction for resources 20. In the illustrated embodiment of the invention, auction control 50 resides in storage device 32. In other embodiments of the invention, auction control 50 may reside in memory device 38, or any other suitable device operable to store and facilitate retrieval of data and instructions. Auction control 50 is discussed in further detail with reference to FIGS. 2 through 4.

Figure 2:
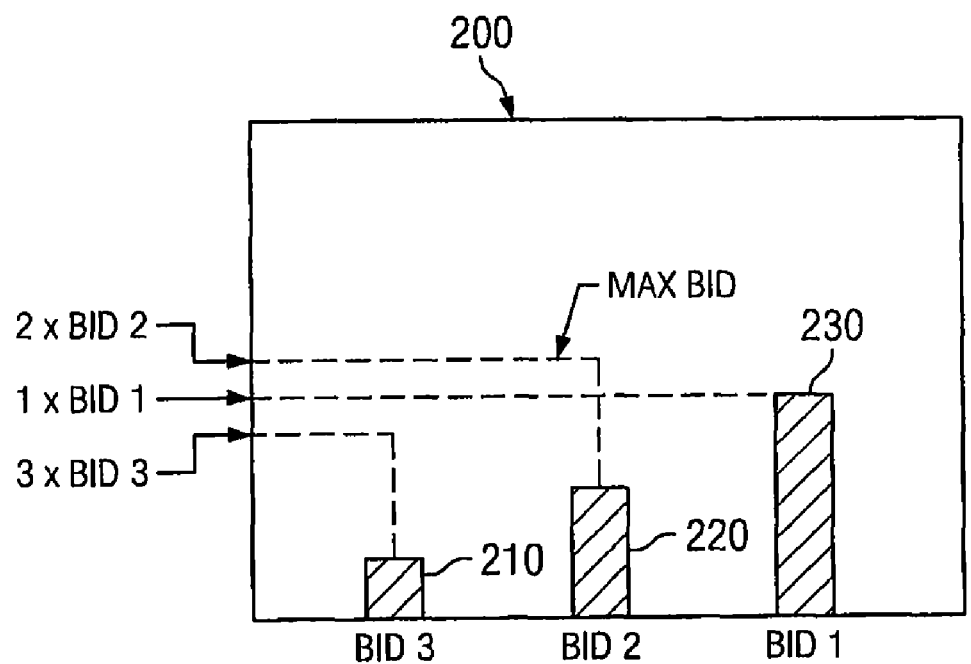
FIGS. 2 and 3 are bar graphs illustrating a method of one embodiment of the system of FIG. 1A.

FIG. 2 is a bar graph 200 illustrating a method of one embodiment of system 10. In this example, auction control 50 (FIG. 1B) has organized each of a plurality of task requests into one or more respective groups 14. Each task request has an associated bid. A group bid may be determined for any given group 14 by multiplying each bid of each task request within the group 14 by a multiplier and comparing the resulting products. In the illustrated example, the three bids levels 210 220 and 230 of a particular group 14 are weighted by their comparative values. More specifically, auction control 50 assigns a 1× multiplier to the highest bid (bid level 230), a 2× multiplier to the second highest bid (bid level 220), and a 3× multiplier to the lowest bid (bid level 210). In this manner, bid level 220 provides the maximum product of the three bid levels and is therefore the bid value for this particular group 14. In some alternative embodiments, the multiplier for any given bid level might be further determined by applying a weight based on the number of users 11 at the particular bid level.

Once group bid values are obtained for each group 14, one or more winning group bids can be determined by comparing the group bids to each other. In this example, the group 14 with the highest group bid is deemed the current winning group 14. All users 11 participating in the non-winning groups 14 may be notified that their bids are currently losing, which may be true even if a particular user 11 of a non-winning group had bid higher than the bid value (e.g., BID 2) that set the winning group bid. Each of these losing users 11 may also be individually sent a respective minimum bid value that informs the user 11 how much it must offer in order to become a winning bidder. In some embodiments, the respective minimum bid value may be different for each user 11 if this value is based on the user's 11 own current standing in the sorted ordering of bids for the user's 11 group. As disclosed previously, particular embodiments may enable users to participate in group bids without the need for their explicit awareness of this participation.

Figure 3:
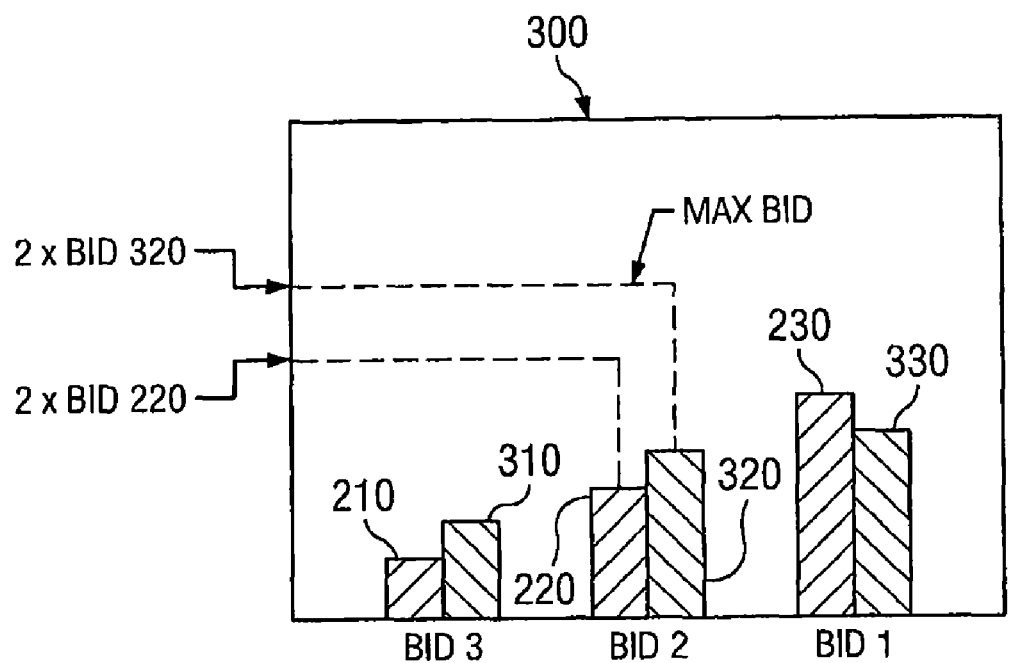

FIG. 3 is a bar graph 300 further illustrating the method of FIG. 2. More specifically, graph 300 contains a second group of bid levels 310, 320, and 330 in addition to those illustrated in graph 200, which serves to further illustrate a method for determining a winning group bid when two groups 14 are competing for the same resource. In this example, the first group bid is calculated by multiplying bid level 220 by 2, which is less than the second group bid calculated by multiplying bid level 320 by 2. The second group (i.e. including bid levels 310, 320, and 330) thus achieves a higher group bid even though the first group (i.e. including bid levels 210, 220 and 230) includes the highest bid level (i.e. bid level 230). In order for the first group to retake the winning position from the second group, in this example, at least one of three bid increases must occur: (1) a bidder at the highest bid level 230 must bid higher than the current winning group bid; (2) a bidder at the second-highest bid level 220 must bid higher than half of the current winning group bid; or (3) a bidder at the third-highest bidder bid level 210 must bid higher than one third of the current winning group bid.

One aspect of the present disclosure recognizes various different bidding rule strategies and alert protocols. Some embodiments inform all members of a winning group that they are winning. Other embodiments, however, may alternatively inform lower bidding members within a winning group 14 that they must increase their bids in order to participate in the success of their group 14. For example, some such embodiments may inform lower bidding users 11 of a winning group 14 that they are not winning and provide them a minimum bid value using the same procedure applied to users 11 in losing groups 14. In this manner, all members of a bidding group 14 may be more encouraged to bid as much for a resource as it is worth to them. If the lower bidding users 11 fail to increase their bid before the auction closes, various embodiments may or may not award such lower bidding users 11 the benefit of the group's task request should their group 14 ultimately win. Because the lower bidders did not expect this data, it may or may not be required by them. However, some embodiments may be optimized by allowing all members of a winning group to share in the benefit, regardless of respective bid offerings.

Figure 4:
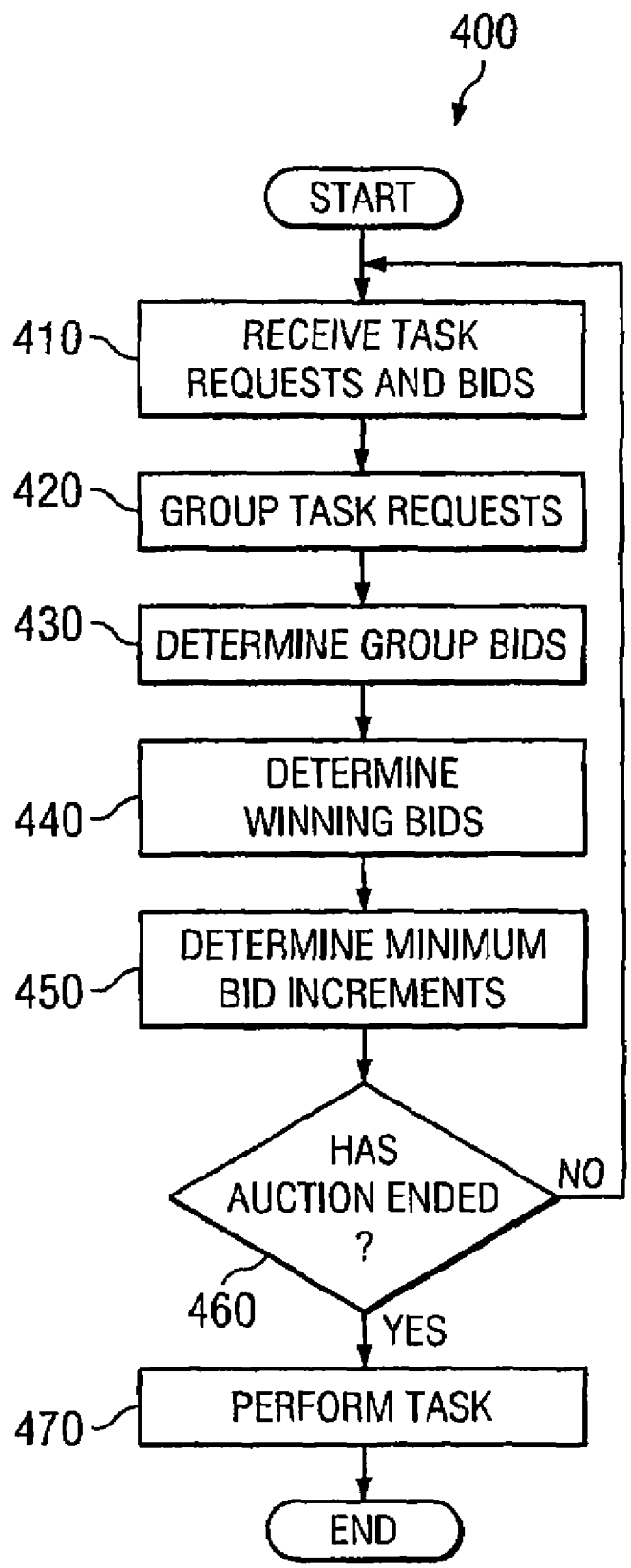
FIG. 4 is a flow chart illustrating one embodiment of a method used to determining winning group bids for an electronic auction.

FIG. 4 is a flow chart 400 illustrating one embodiment of a method used to determining winning group bids for an electronic auction. In this example, the method of system 10 includes receiving task requests and bids, grouping task requests, determining group bids, determining winning bids from among the group bids, determining minimum bid increments, and performing the winning requested task. The example acts may be performed by auctioneer 18, as discussed above with reference to FIGS. 1A and 1B, user agent 12, or by any other suitable device.

At step 410, task requests and respective bids are received. In one embodiment, an auction is initiated upon reception of particular task requests. In alternative embodiments, the bidding process for one or more particular tasks are set up for a limited amount of time, at the end of which, the highest bid wins the auction and resources 20. In some such embodiments, connections to the auction are allowed only during the limited amount of time which begins and ends at predetermined moments. Task requests are grouped together in step 420. For example, all task requests having common parameters may be grouped together in a manner similar to the examples described above with reference to FIG. 1A. In addition, group divisions may be predetermined or dynamically formed, as previously described.

At step 430, group bids are determined. For example, group bids may be determined using the example methods described with reference to FIGS. 2 and 3. One or more winning bids are determined at step 440. For example, a winning bid may be determined by comparing the values of the group bids determined at step 430.

At step 440, minimum bid increments are determined. For example, the method for determining a minimum bid increment necessary to win an auction may include the following steps:
1. Find the group bid for each group as described above
2. Let win_level_max represent the maximum value of among the group bids
3. For each losing group do the following:
   a. Assign the bidders in the group into bins according to their bids, each bin having a value n corresponding to a rank in a sorted list of the bins
   b. Let k be the total number of bins
   c. For n from 1 to k do the following:
      i. Let minimum_to_win(n) represent win_level_max/n
      ii. If minimum_to_win(n)>minimum_to_win(n-1) then set minimum_to_win(n) to minimum_to_win (n-1)
      iii. Send all bidders their respective minimum_to_win (n) value.

Steps 410 through 450 are repeated until it is determined that the auction has ended in step 460. The one or more requested tasks associated with the winning group(s) are then performed in step 470.

Thus, advantages of certain embodiments of the present disclosure include facilitating the market-based allocation or tasking of one or more resources such that their outputs may provide enhanced value to one or more users or tasks that may benefit from that output. Some embodiments may allocate a potentially unlimited number of identical, easily replicated items that have yet to be produced. Various embodiments allow multiple bidders to be automatically and dynamically grouped together to win a particular resource. In some embodiments, group participation may be completely transparent to individual bidders, thereby enhancing privacy and facilitating the bidding process. Some embodiments provide enhanced pricing mechanisms that may enhance individual bidder incentive.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for an electronic auction transaction, comprising:
   receiving at a computer a plurality of task requests, each task request corresponding to a respective desired use of one or more resources, and each task request having a respective task bid;
   organizing by the computer each task request into one or more respective groups, the task requests of each group having at least one point of commonality;
   determining by the computer a group bid for each group at least in part by assigning a respective weight to each task bid within the group, the group bid indicative of a collective value associated with the task bids of the group;
   determining by the computer one or more winning group bids by comparing the group bids to each other; and
   performing, by at least one of the one or more resources, one or more of the tasks requests corresponding to the one or more winning group bids.

2. The method of claim 1, wherein determining by the computer a group bid for each group at least in part by assigning a respective weight to each task bid within the group further comprises:
multiplying each task bid within the group by a respective multiplier, the respective multiplier being a number indicative of the comparative value of the task bid relative to the other task bids in the group; and
comparing each of the products calculated by multiplying each task bid within the group by the respective multiplier.

3. The method of claim 2, further comprising determining by the computer a minimum subsequent bid for each task request of at least a subset of the plurality of task requests at least in part by dividing one of the one or more winning group bids by the respective multiplier of the respective task bid.

4. The method of claim 3, wherein the minimum subsequent bids for each task request of at least a subset of the plurality of task requests comprise first and second minimum subsequent bids, the first minimum sequent bid having a value that is different from the second minimum subsequent bid.

5. The method of claim 3, further comprising communicating by the computer each minimum subsequent bid to a respective user agent through a data network.

6. The method of claim 5, wherein at least one of the minimum subsequent bids communicated to the respective user agent through the data network corresponds to one of the plurality of task requests organized into one of the one or more respective groups having the determined one or more winning group bids.

7. The method of claim 1, wherein the one or more respective groups are hierarchically organized.

8. The method of claim 1, wherein the determining by the computer one or more winning group bids further comprises:
determining a high-level winner by comparing the group bids to each other for a set of high-level groups of the one or more groups; and
determining a mid-level winner by comparing the group bids to each other for a sub-set of mid-level groups of the high-level group determined to be high-level winner.

9. The method of claim 1, wherein the organizing further comprises dynamically reassigning, by the computer, each task request of one or more of the plurality of task requests to a respective different group of the one or more respective groups.

10. The method of claim 1, wherein the performing further comprises generating, by the computer, information and communicating, by the computer, the information to one or more user agents through a data network.

11. The method of claim 1, wherein the respective desired use of one or more resources is a pan angle of a camera.

12. The method of claim 1, wherein at least a subset of the task requests corresponding to the one or more winning group bids comprises:
a first task request having a weighted value calculated at least in part by multiplying the respective weight of the first task request by its respective task bid, the weighted value of the first task request greater than all other weighted values calculated for each task request of the at least a subset of the task requests corresponding to the one or more winning group bids; and
a second task request having a respective task bid that is greater than the respective task bid of the first task request.

13. The method of claim 12, further comprising determining the charge value at least in part by determining the lowest task bid of the respective task bids of the at least a subset of the task requests corresponding to the one or more winning group bids.

14. The method of claim 1, further comprising applying a monetary charge to each task request of the at least a subset of the tasks requests corresponding to the one or more winning group bids, the monetary charge demanding a charge value that is the same for each task request of the at least a subset of the task requests corresponding to the one or more winning group bids.

15. An electronic auction apparatus, comprising:
a processor;
a computer-readable media communicatively coupled to the processor; and
logic embodied in the computer-readable media, and when executed operable to:
receive a plurality of task requests, each task request corresponding to a respective desired use of one or more resources, and each task request having a respective task bid;
organize each task request into one or more respective groups, the task requests of each group having at least one point of commonality;
determine a group bid for each group at least in part by assigning a respective weight to each task bid within the group, the group bid indicative of a collective value associated with the task bids of the group; and
determine one or more winning group bids by comparing the group bids to each other.

16. The apparatus of claim 15, wherein the logic when executed is further operable to assign a respective weight to each task bid by multiplying each task bid within the group by a respective multiplier, the respective multiplier being a number indicative of the comparative value of the task bid relative to the other task bids in the group.

17. The apparatus of claim 16, wherein the logic is further operable to determine a minimum subsequent bid for each task request of at least a subset of the plurality of task requests at least in part by dividing one of the one or more winning group bids by the respective multiplier of the respective task bid.

18. The apparatus of claim 17, wherein the minimum subsequent bids for each task request of at least a subset of the plurality of task requests comprise first and second minimum subsequent bids, the first minimum sequent bid having a value that is different from the second minimum subsequent bid.

19. The apparatus of claim 17, wherein the logic is further operable to communicate each minimum subsequent bid to a respective user agent through a data network.

20. The apparatus of claim 19, wherein at least one of the minimum subsequent bids communicated to the respective user agent through the data network corresponds to one of the plurality of task requests organized into one of the one or more respective groups having the determined one or more winning group bids.

21. The apparatus of claim 15, wherein the one or more respective groups are hierarchically organized.

22. The apparatus of claim 15, wherein the respective desired use of one or more resources is a pan angle of a camera.

23. The apparatus of claim 15, wherein the logic is further operable to determine one or more winning group bids by:
determining a high-level winner by comparing the group bids to each other for a set of high-level groups of the one or more groups; and determining a mid-level winner by comparing the group bids to each other for a sub-set of mid-level groups of the high-level group determined to be high-level winner.

24. The apparatus of claim 15, wherein the logic is further operable to dynamically reassign each task request of one or more of the plurality of task requests to a respective different group of the one or more respective groups.

25. The apparatus of claim 15, wherein the logic is further operable to communicate an instruction to one or more resources operable to perform one or more of the task requests corresponding to the one or more winning group bids.

26. The apparatus of claim 25, wherein the logic is further operable to distribute to one or more user agents information generated by the one or more resources, the information generated by the one or more resources in response to the communicated instruction.

27. A method for an electronic auction transaction, comprising:
  organizing by a computer each of a plurality of task requests into one or more respective groups, each task request corresponding to a respective desired use of one or more resources, and each task request having a respective task bid;
  determining by the computer a group bid for each group at least in part by assigning a respective weight to each task bid within the group, the group bid indicative of a collective value associated with the task bids of the group; and
  determining by the computer one or more winning group bids by comparing the group bids to each other.

28. The method of claim 27, wherein determining by the computer a group bid for each group at least in part by assigning a respective weight to each task bid within the group further comprises:
  multiplying each task bid within the group by a respective multiplier, the respective multiplier being a number indicative of the comparative value of the task bid relative to the other task bids in the group; and
  comparing each of the products calculated by multiplying each task bid within the group by the respective multiplier.

29. The method of claim 28, further comprising determining by the computer a minimum subsequent bid for each task request of at least a subset of the plurality of task requests at least in part by dividing one of the one or more winning group bids by the respective multiplier of the respective task bid.

30. The method of claim 29, wherein the minimum subsequent bids for each task request of at least a subset of the plurality of task requests comprise first and second minimum subsequent bids, the first minimum sequent bid having a value that is different from the second minimum subsequent bid.

31. The method of claim 29, further comprising communicating by the computer each minimum subsequent bid to a respective user agent through a data network.

32. The method of claim 31, wherein at least one of the minimum subsequent bids communicated to the respective user agent through the data network corresponds to one of the plurality of task requests organized into one of the one or more respective groups having the determined one or more winning group bids.

33. The method of claim 27, further comprising dynamically reassigning, by the computer, each task request of one or more of the plurality of task requests to a respective different group of the one or more respective groups.

34. The method of claim 27, further comprising performing, by at least one of the one or more resources, one or more of the tasks requests corresponding to the one or more winning group bids.

35. The method of claim 27, wherein the respective desired use of one or more resources is a pan angle of a camera.

36. A method for an electronic auction transaction, comprising:
  organizing by a computer each of a plurality of task requests into one or more respective groups, each task request corresponding to one or more respective products yet to be produced, and each task request having a respective task bid;
  determining by the computer a group bid for each group at least in part by assigning a respective weight to each task bid within the group, the group bid indicative of a collective value associated with the task bids of the group; and
  determining by the computer one or more winning group bids by comparing the group bids to each other.

37. The method of claim 36, wherein determining by the computer a group bid for each group at least in part by assigning a respective weight to each task bid within the group further comprises:
  multiplying each task bid within the group by a respective multiplier, the respective multiplier being a number indicative of the comparative value of the task bid relative to the other task bids in the group; and
  comparing each of the products calculated by multiplying each task bid within the group by the respective multiplier.

38. The method of claim 36, further comprising selecting for production at least one of the one or more respective products yet to be produced based at least in part on the determined one or more winning group bids.

39. The method of claim 38, further comprising producing a plurality of copies of the at least one of the one or more respective products selected for production.

40. The method of claim 39, further comprising distributing the plurality of copies in digital form.

41. The method of claim 36, wherein at least one task request of the plurality of task requests controls a detail of at least one of the corresponding one or more respective products, the at least one of the one or more corresponding respective products selected from group consisting of:
  a musical composition;
  a writing;
  an image;
  a photograph;
  a video; and
  a poem.

42. The method of claim 41, wherein the detail is a desired subject associated with the at least one of the one or more corresponding respective products.

* * * * *